United States Patent
Ichimura

(10) Patent No.: US 6,349,013 B1
(45) Date of Patent: Feb. 19, 2002

(54) SENSOR FOR IDENTIFYING A MAGNETIC RECORDING MEDIUM UTILIZING ROTATABLE FLAGS WHICH COOPERATE TO ENTER A CUT-OUT PORTION IN THE MEDIUM

(75) Inventor: Masaru Ichimura, Yonezawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/525,473

(22) Filed: Mar. 15, 2000

(30) Foreign Application Priority Data

Mar. 15, 1999 (JP) .......................... 11-069304

(51) Int. Cl.[7] .............................................. G11B 5/008
(52) U.S. Cl. ........................................................ 360/94
(58) Field of Search ....................................... 360/94, 60

(56) References Cited

U.S. PATENT DOCUMENTS 3,685,171 A * 8/1972 Kosaka ........................ 360/94
5,390,057 A * 2/1995 Nishimura ................... 360/94

FOREIGN PATENT DOCUMENTS

| JP | 6-338179 | 12/1994 |
| JP | 7-240082 | 9/1995 |
| JP | 2688420 | 8/1997 |

* cited by examiner

Primary Examiner—A. J. Heinz
(74) Attorney, Agent, or Firm—McGinn, & Gibb, PLLC

(57) ABSTRACT

The sensor for detecting a medium having a cut-out portion on a movable tray, according to the present invention, comprises: a rotatable first flag which is rotationally urged, the first flag, when contacting with the moved tray, being rotated in the anti-urging direction; a rotatable second flag which is rotationally urged in the reverse direction to the first flag, the rotation of the first flag being restricted by a stopper provided on the first flag; a flag detector which is turned on or off by the rotation of the second flag; and a cut-out portion detector for entering the cut-out portion of the medium.

5 Claims, 8 Drawing Sheets

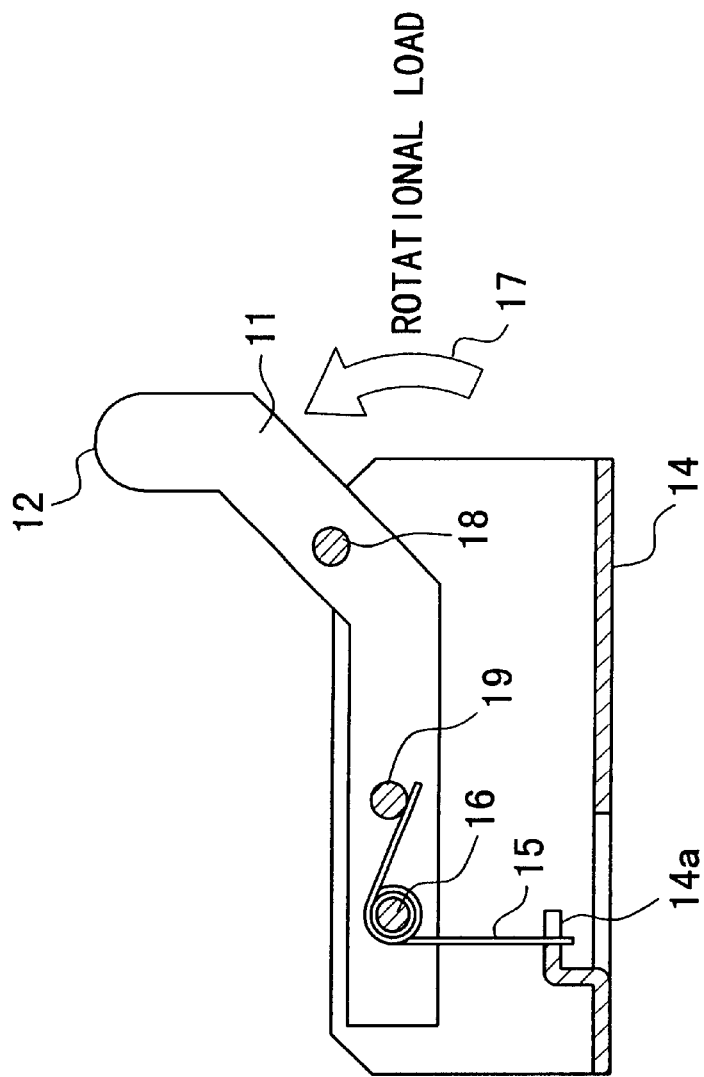
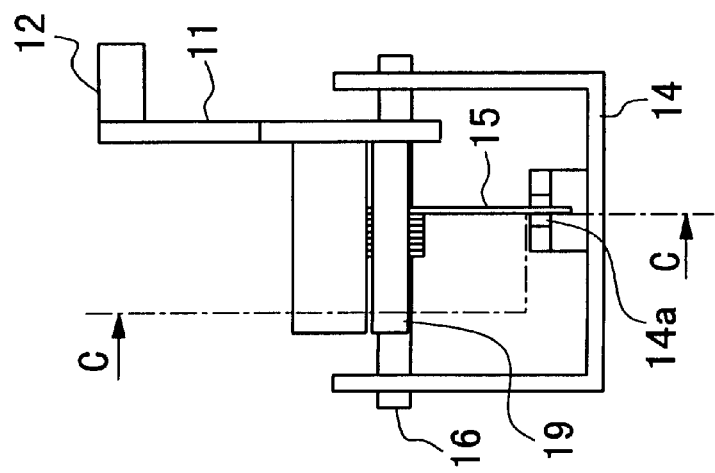

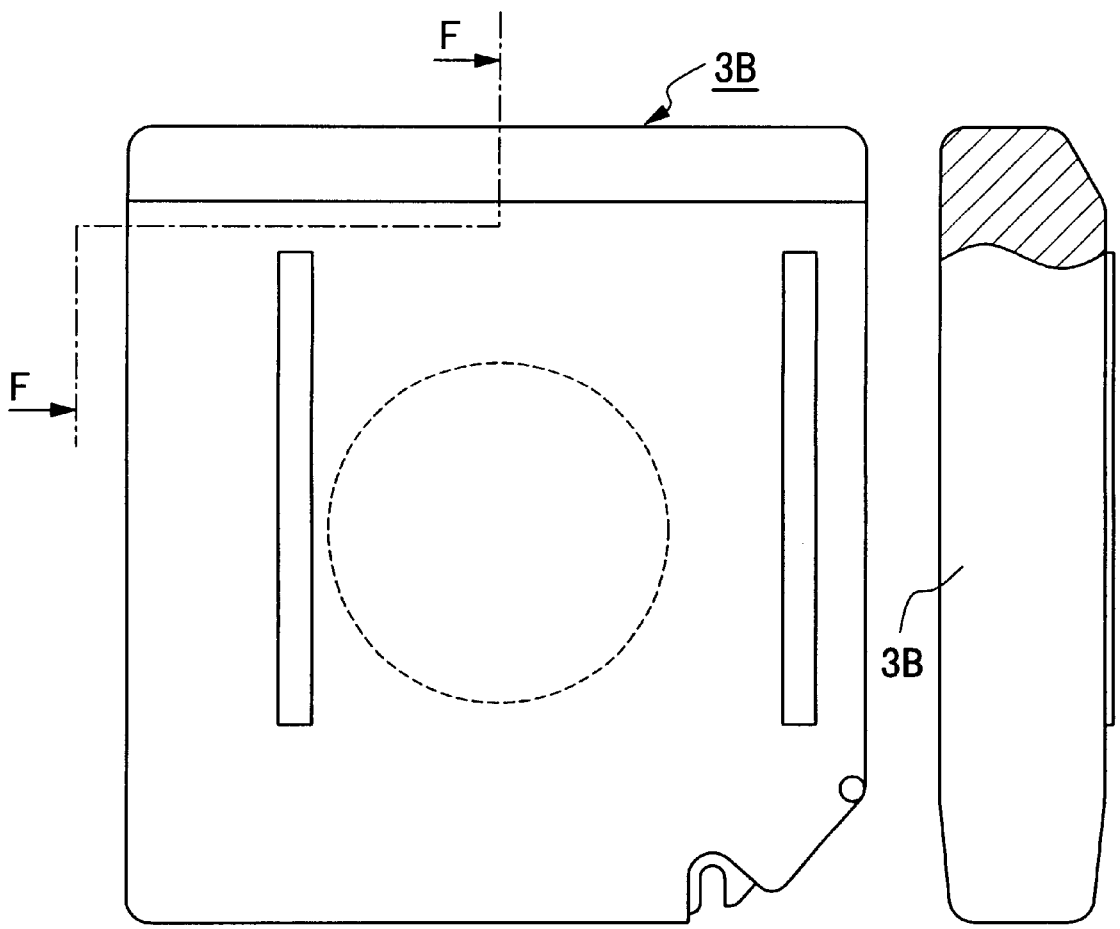

PRIOR ART  FIG.8A
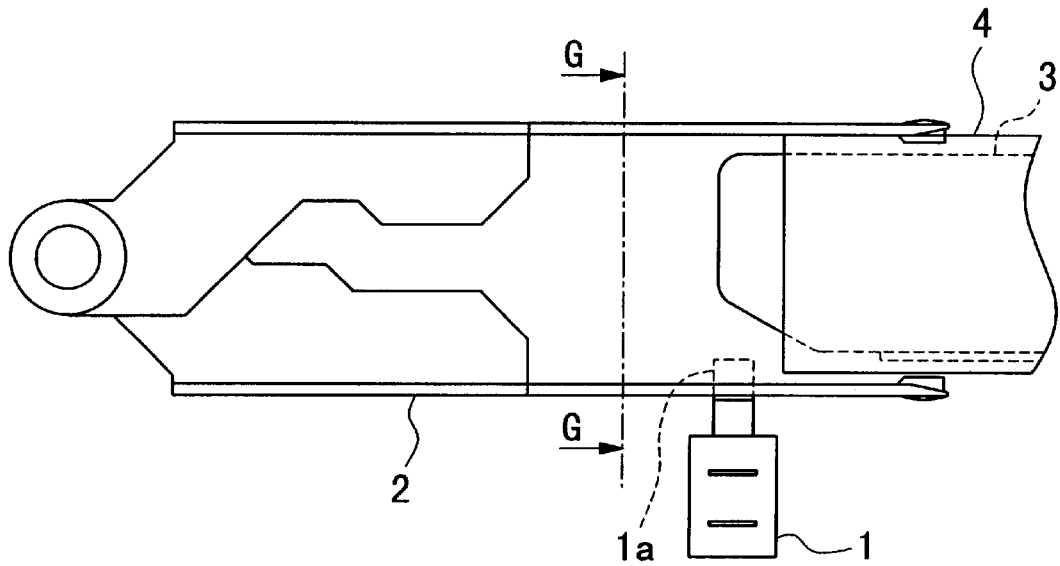
PRIOR ART  FIG.8B
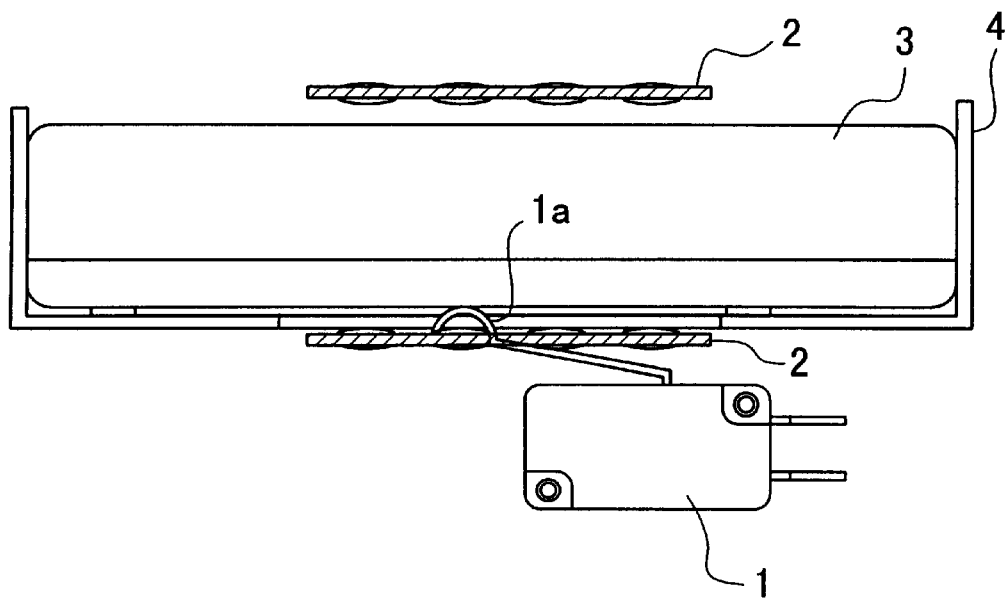

SENSOR FOR IDENTIFYING A MAGNETIC RECORDING MEDIUM UTILIZING ROTATABLE FLAGS WHICH COOPERATE TO ENTER A CUT-OUT PORTION IN THE MEDIUM

BACKGROUND OF THE INVENTION

1. Field of the Invention

The present invention relates to a sensor for identifying the type of a magnetic recording medium (hereinafter referred to as a "medium") loaded on a tray, and, in particular, to a sensor for identifying a 128TR medium having a cut-out portion.

This application is based on Japanese Patent Application No. 11-69304, the contents of which are incorporated herein by reference.

2. Description of the Related Art

In a magnetic tape library using both a magnetic tape device for a 36-track medium (36TR medium) and a magnetic tape device for a 128-track medium (128TR medium), 36TR media and 128TR media are stored at the same time. Since the 36TR medium differs in the shape of the leader block from the 128TR medium, a tape extracting arm in the 36TR device cannot extract the leader block of the 128TR medium.

Generally, the medium is loaded into the library, and is mounted, and the tape is extracted. Based on whether or not the rotated extracting arm misses the leader block, the conventional technique identifies the type of the medium.

When the leader block of the 36TR medium is damaged, the extracting arm may miss the leader block, and the loaded 36TR medium may be mis-identified as a 128TR medium.

The magnetic tape library in general utilizes a robot hand for loading and unloading the medium. When a micro switch is used to identify the type of the medium, a movable switch portion 1a of the micro switch 1 is always raised as shown in FIGS. 8A and 8B, the movable switch portion 1a may interfere with the robot hand 2. In these figures, reference numeral 3 denotes the magnetic medium, and reference numeral 4 denotes a tray.

BRIEF SUMMARY OF THE INVENTION

It is therefore an object of the present invention to provide a sensor for reliably identifying a 128TR magnetic medium based on the detection of a stronger section of the medium.

In order to accomplish the above object, the sensor for detecting a medium having a cut-out portion on a movable tray, according to the present invention, comprises: a rotatable first flag which is rotationally urged, the first flag, when contacting with the moved tray, being rotated in the anti-urging direction; a rotatable second flag which is rotationally urged in the reverse direction to the first flag, the rotation of the first flag being restricted by a stopper provided on the first flag; a flag detector which is turned on or off by the rotation of the second flag; and a cut-out portion detector for entering the cut-out portion of the medium.

According to the sensor of the present invention, when a medium having a cut-out portion is mounted in the magnetic tape device, the cut-out portion detector enters the cut-out portion of the medium, the second flag is rotated, and the flag detector is actuated.

When a medium without a cut-out portion is mounted on the magnetic tape device, the cut-out portion detector contacts with the medium and cannot be rotated, and the flag detector is not actuated.

BRIEF DESCRIPTION OF THE DRAWINGS

FIG. 1A is a front view showing the situation of the sensor before a tray on which the 128TR medium is mounted is lowered, FIG. 1B is a front view showing the situation of the sensor after the tray with the 128TR medium is lowered, and FIG. 1C is a right side view showing a principal part of the sensor shown in FIG. 1B.

FIG. 1A is a front view of the sensor before a tray on which a 36TR medium is mounted is lowered, FIG. 1B is a front view of the sensor after the tray with the 36TR medium is lowered, and FIG. 1C is a right side view showing a principal part of the sensor shown in FIG. 1B.

FIG. 3A is a front view of the sensor, and FIG. 3B is a cross-sectional view along the line A—A.

FIG. 4A and 4B are diagrams showing a first flag attached to a holder according to the present invention. FIG. 4A is a view seen from the arrow B shown in FIG. 1A, and FIG. 4B is a cross-sectional view along the line C—C.

FIG. 5A is a view seen from the arrow B shown in FIG. 1A, and FIG. 1B is a cross-sectional view along the line D—D.

FIG. 6A is a front view of the 128TR medium, FIG. 6B is a bottom view of the 128TR medium, and FIG. 6C is a cross-sectional view along the line E—E.

FIGS. 7A to 7C are diagrams showing the shape of the 36TR medium. FIG. 7A is a front view of the 36TR medium, FIG. 7B is a bottom view of the 36TR medium, and FIG. 7C is a cross-sectional view along the line F—F.

FIGS. 8A and 8B are diagrams showing a conventional device. FIG. 8A is a front view of the device when a robot hand loads or unloads a medium, and FIG. 8B is a cross-sectional view of the device along the line G—G.

DETAILED DESCRIPTION OF THE INVENTION

Figure 1A:
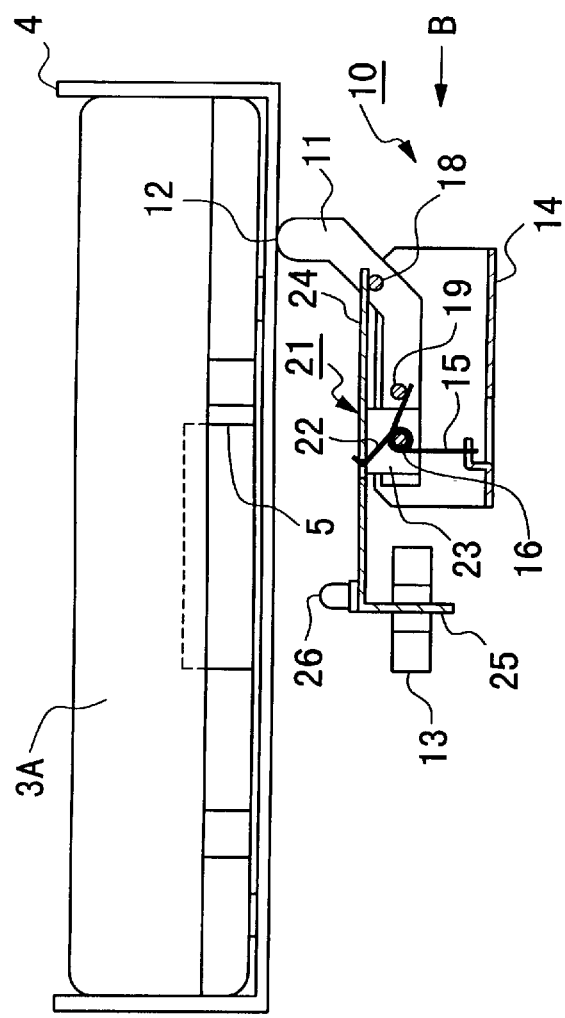
FIGS. 1A to 1C are diagrams showing an embodiment of the sensor for identifying a 128TR medium according to the present invention.

The sensor 10 of the present invention distinguishes a 128TR magnetic recording medium 3A, which is loaded on a vertically movable tray 4 in a magnetic tape library, from a 36TR recording medium 3B. This sensor 10 mainly comprises a first flag 11, a second flag, and a photo sensor (flag detector) 13.

As shown in FIG. 4, the first flag 11 has an approximately J-(or L-) shape and is attached rotatably by means of a guide shaft 16 to a holder 14 which is a supporter fixed to the tape library. The first flag 11 is urged by a torsion coil spring 15, and can be rotated in the anti-urging direction when the first flag 11 is pushed by the lowered tray 4. The rotational axis is provided near one end of the first flag 11. In the example shown in the figures, the first flag 11 is urged counterclockwise by the torsion coil spring 15 (as shown by the outlined arrow 17). When the end opposite to the rotational axis is pushed by the lowered tray 4, the first flag 11 is rotated against the urging force of the torsion coil spring 15.

A protrusion 12 for contacting with the underside of the lowered tray 4 is formed at the opposite end to the rotational axis. The first flag 11 has a stopper 18 for contacting with the second flag 21, and an engaging portion 19 for engaging with one end of the torsion coil spring 15 and with one end of a torsion coil spring 22 of the second flag 21. The other end of the torsion coil spring 15 is engaged with an engaging portion 14a formed on the holder 14.

The second flag 21 is rotatably attached by means of the guide shaft 16, and is urged by the torsion coil spring 22 in the direction opposite to the urging direction of the first flag 11. The second flag 22 has an approximately L-shape, and has a support plate 23 protruding from the middle of the second flag 22. The guide shaft 16 is inserted through a shaft hole made in the support plate 33 so that the second flag 21 is supported and is urged clockwise by the torsion coil spring 22 (as shown by the outlined arrow 17). One end of the torsion coil spring 22 is engaged with the engaging portion 19, while the other end is engaged with an engaging hole 21a of the second flag 21.

The rotation of the second flag 21, which is urged clockwise, is restricted by the stopper 18 so that the long portion 24 of the L-shape becomes horizontal. In this situation, a predetermined space is made between the tray 4 and the long portion 24.

The short portion 25 of the L-shape turns the photo sensor 13 on or off. A shaft 26 protrudes from the end of the upper side of the long portion 24 (opposite to the stopper 18) just above the short portion 25. When the medium has a step portion (cut-out portion) 5, the shaft (cut-out portion detector) 26 enters the step portion 5 to thereby distinguish the 128TR medium 3A from the 36TR medium 3B. Thus, the shaft 26 acts as a cut-out portion detector for identifying the 128TR medium 5 when entering the step portion 5 of the 128TR medium 5.

The photo sensor 13 is turned on or off, depending on the rotation of the second flag 21. The photo sensor 13 detects the movement of the short portion 25 as the second flag 21 is rotated.

Figure 6A:
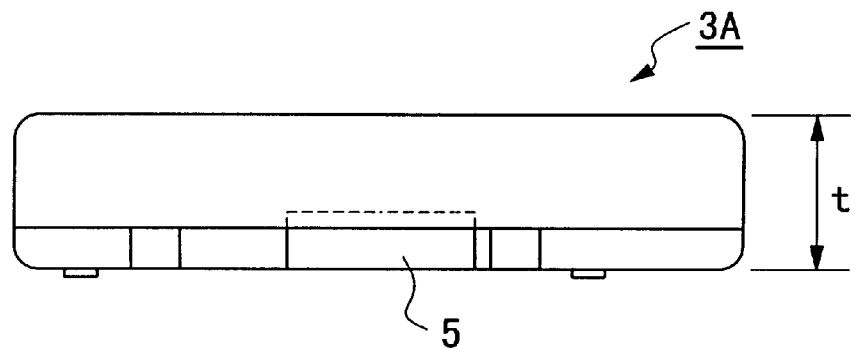
FIGS. 6A to 6C are diagrams showing the shape of the 128TR medium.
Figures 6B, 6C:
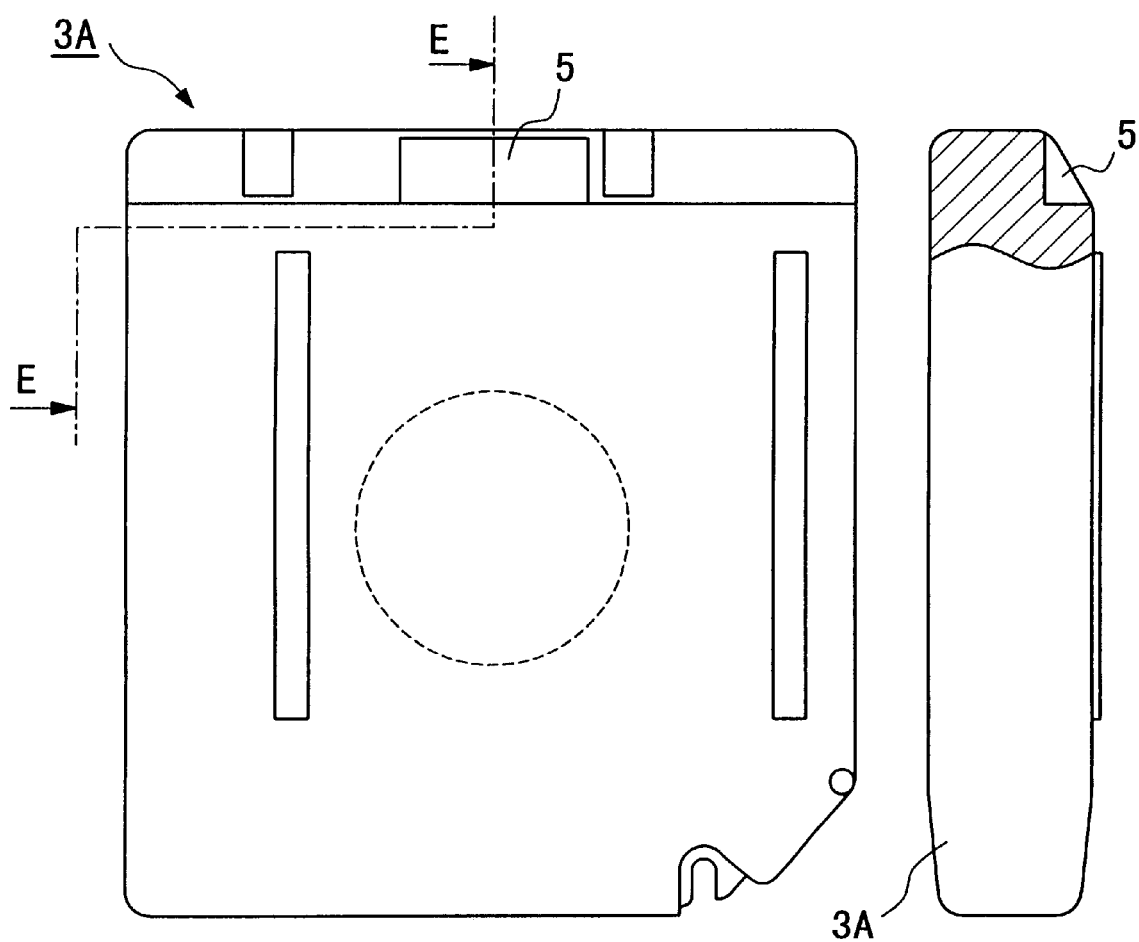

The 128TR medium 3A is shown in FIG. 6, and the 36TR medium 3B is shown in FIG. 7. The differences between them will be explained. The media 3A and 3B have rectangular cross-sections with thickness t. While the 128TR medium has a step portion 5 which is formed in the face (the bottom of the medium shown in FIG. 6B) to be mounted on the tray and close to an edge at its middle, the 36TR medium has no step portion. The sensor 10 of the present invention identifies the medium, based on the presence or absence of the step portion 5 which is the difference between the media 3A and 3B.

The sensor 10 operates as follows.

As shown in FIG. 4, the first flag is urged counterclockwise. When the sensor 10 is mounted in the magnetic tape device, the tray 4 for mounting the medium 3A or 3B (mounting the medium onto a drive motor) acts as a stopper against the rotation of the first flag 11. Just when the medium is loaded into the magnetic tape device, the tray stays at the upper position, the long portion 24 of the second flag 21 is horizontal, and the short portion 25 turns off the photo sensor 13.

Figure 1B:
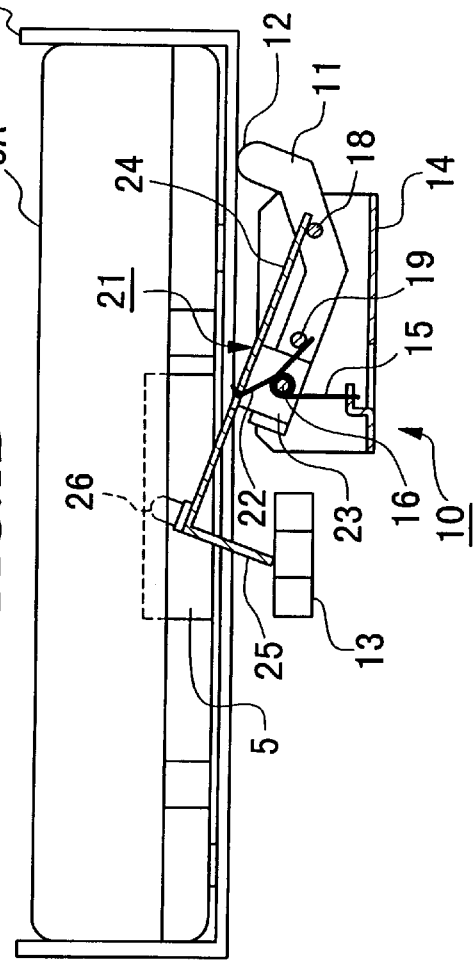
Figure 1C:
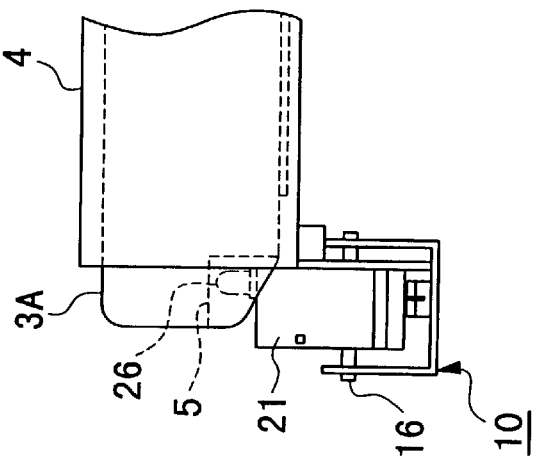

As the tray 4 is lowered to mount the medium, the first flag 11 is pushed down and is rotated clockwise. Simultaneously, the stopper 18 is rotated clockwise, so that the second flag 21 is rotated clockwise by the urging force of the torsion coil spring 22. As a result, as shown in FIG. 1, when the 128RT medium 3A is loaded on the tray 4, the shaft 26 of the second flag 21 enters the step portion 5 of the 128TR medium 3A so that the second flag 21 and the first flag 11 are rotated together, and then the short portion 25 is retracted to thereby turn the photo sensor 13 on.

Figure 2C:
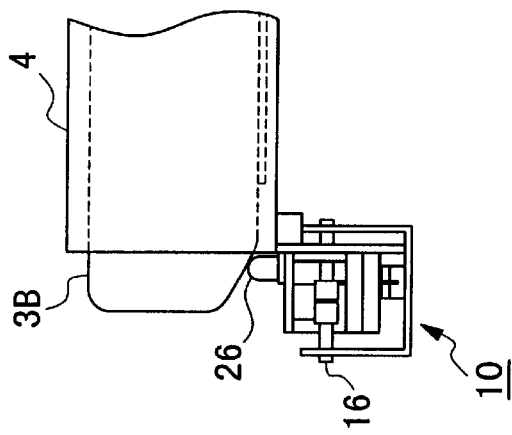
FIGS. 2A to 2C are diagrams showing the embodiment of the sensor for identifying a 128TR medium according to the present invention.
Figure 2A:
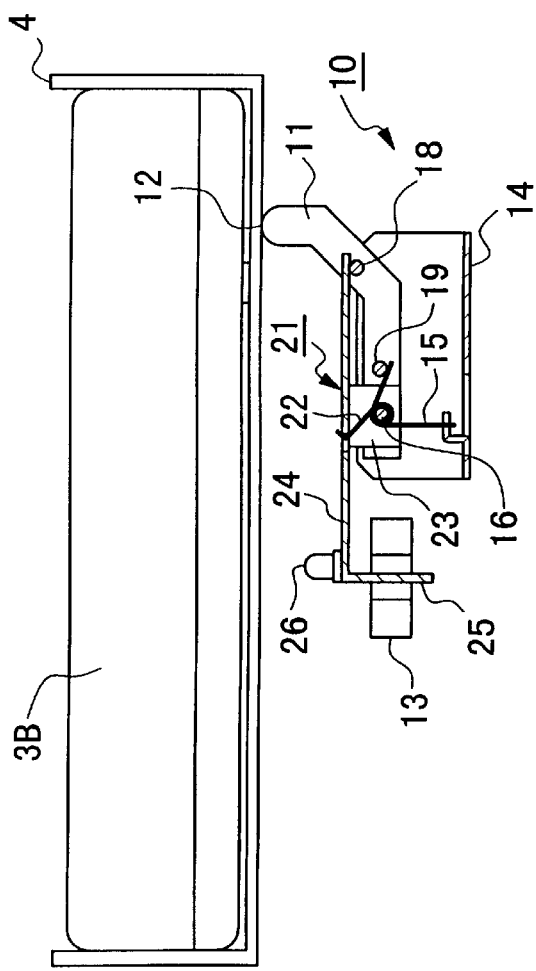
Figure 2B:
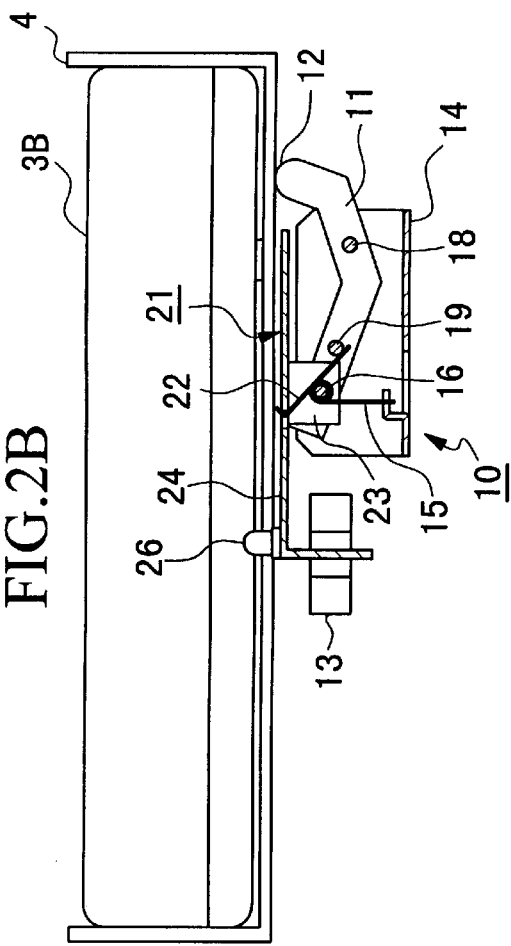
Figure 3A:
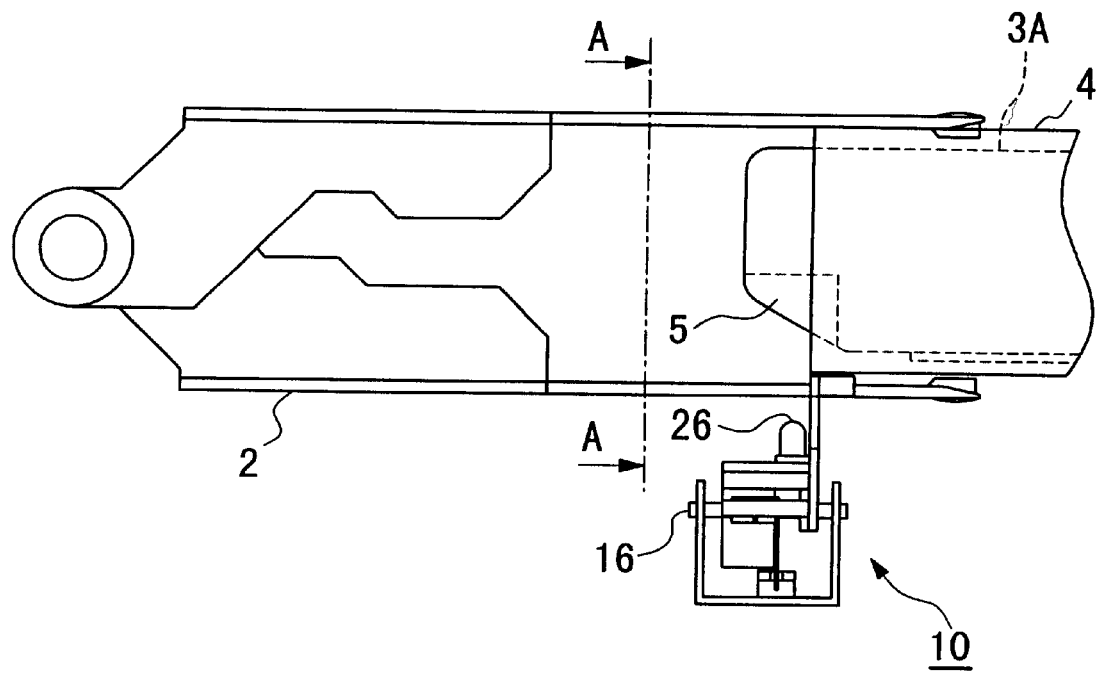
FIGS. 3A and 3B are diagrams showing the loading/unloading of the medium by a robot hand according to the present invention.
Figure 3B:
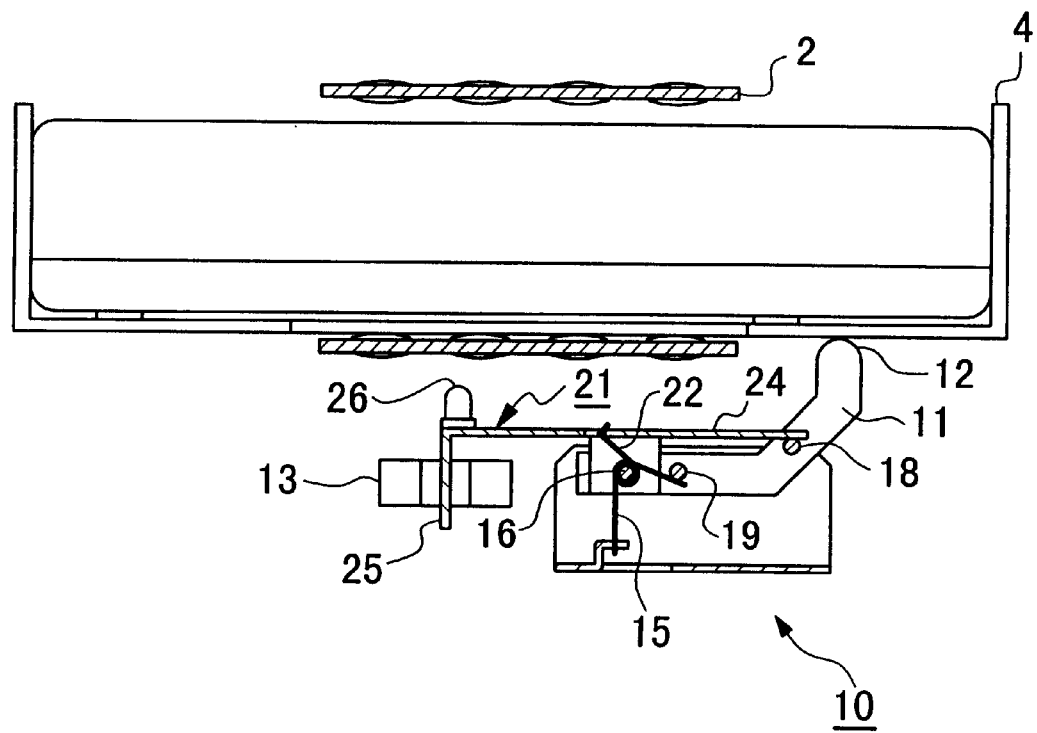
Figure 5A:
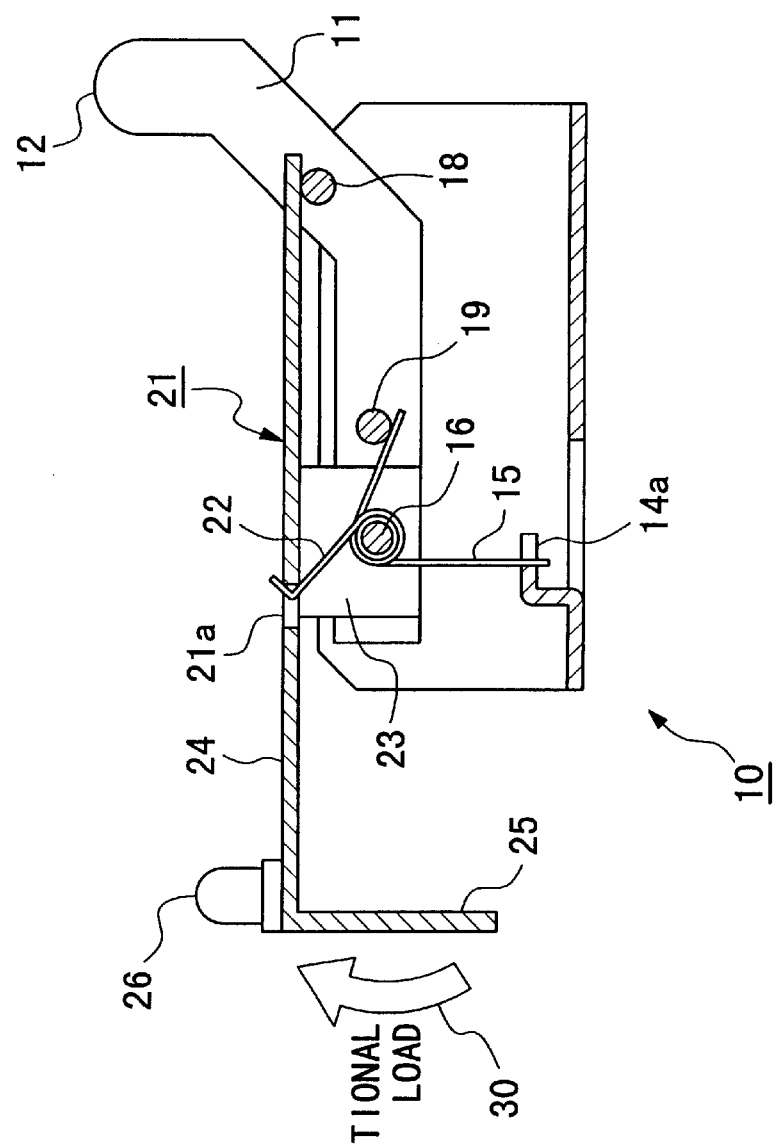
FIGS. 5A and 5B are diagrams showing a second flag attached to the holder shown in FIGS. 4A and 4B.
Figure 5B:
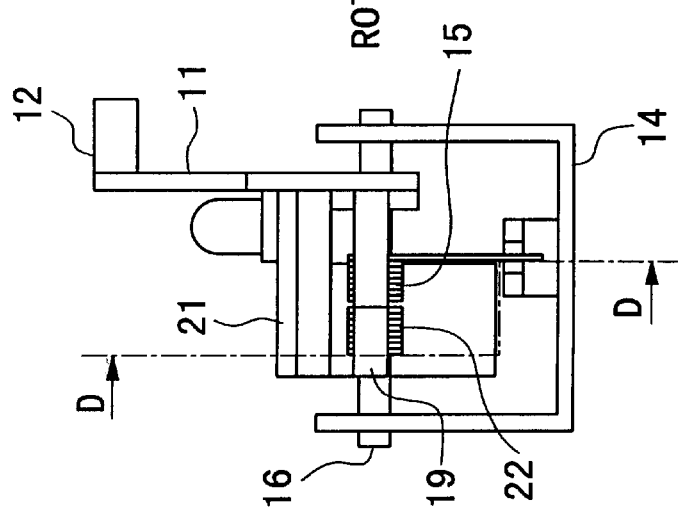

As shown in FIG. 2, when the 36TR medium 3B is loaded into the device, the shaft 26 of the second flag 21 comes in contact with the mounting face of the 36TR medium 3B because the 36TR medium 3B has no step portion. As a result, the rotation of the second flag 21 is restricted, the short portion 25 remains to turn the photo sensor 13 off.

Thus, based on whether or not the shaft 26 of the second flag 21 enters the step portion 5, the photo sensor 13 is turned on or off, and therefore the 128TR medium 3A with the step portion 5 is reliably distinguishable from the 36TR medium 3B having no step portion. The possibility of mis-detection due to damage to the step portion 5 is extremely low because the step portion 5, which comes in contact with the shaft 26, has sufficient strength.

When loading or unloading the 128TR medium 3A and the 36TR medium 3B, there is a predetermined gap between the shaft 26 and the tray 4 by the effect of two torsion coil springs 15 and 22 and the stopper 18. Therefore, the robot hand 2 does not interfere with these parts.

Thus, the sensor 10 of the present invention identifies the medium, depending on the difference in shape between the 128TR medium 3A and 36TR medium 3B. Further, when loading or unloading the medium, the sensor 10 having two springs lowers the shaft 26, which acts as the switch, below the tray 4 so that the robot hand 2 does not interfere with the shaft 26. As the medium is mounted, the switch (shaft) is rotated, and the type of the medium can be identified.

While in the embodiment the first flag 11 and the second flag 21 biases (gives the rotational load on) the torsion coil springs 15 and 22, the other springs such as compression springs can be employed. The detector is not limited to the photo sensor 13, and other known sensors may be employed.

The sensor of the present invention has the following advantages:

1) According to the conventional technique, the medium is loaded and mounted, and then the type of the medium is identified, based on whether or not a rotated extracting arm misses the leader block. The present invention identifies the medium at the time of mounting the medium, thus reducing the time required to identify the medium.

2) According to the conventional technique, when the leader block of the 36TR medium is damaged, a rotated extracting arm may miss the leader block, and the loaded medium may be mis-identified as the 128TR medium. The sensor of the present invention reliably identifies the medium, based on the presence or absence of the stronger section of the medium.

3) The magnetic tape library utilizes a robot hand for loading and unloading the medium. When a micro switch is used to identify the type of the medium, a part of the movable switch may interfere with the robot hand. The sensor of the present invention having two springs lowers the switch (shaft) when loading or unloading the medium, so that the robot hand does not interfere with the sensor.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A sensor for detecting a medium having a cut-out portion on a movable tray, comprising:

a rotatable first flag which is rotationally urged, said first flag, when contacting with said moved tray, being rotated in the anti-urging direction;

a rotatable second flag which is rotationally urged in the reverse direction to the first flag, the rotation of the first flag being restricted by a stopper provided on said first flag;

a flag detector which is turned on or off by the rotation of said second flag; and a cut-out portion detector for entering the cut-out portion of said medium.

2. A sensor according to claim 1, wherein said medium is a 128-track medium.

3. A sensor according to claim 1, wherein, when loading or unloading said medium, a predetermined gap is made between the cut-out portion detector and said tray.

4. A sensor according to claim 1, wherein s aid flag detector is a photo sensor.

5. A magnetic tape device comprising:

a movable tray for loading a medium having a cut-out portion:

a rotatable first flag which is rotationally urged, said first flag, when contacting with said moved tray, being rotated in the anti-urging direction;

a rotatable second flag which is rotationally urged in the reverse direction to the first flag, the rotation of the first flag being restricted by a stopper provided on said first flag;

a flag detector which is turned on or off by the rotation of said second flag; and a cut-out portion detector for entering the cut-out portion of said medium.

* * * * *